United States Patent
Yokoyama et al.

(10) Patent No.: US 7,165,840 B2
(45) Date of Patent: Jan. 23, 2007

(54) PROCESS FOR PRODUCING CONTACT LENS HAVING A MARK AND CONTACT LENS HAVING A MARK OBTAINED THEREBY

(75) Inventors: Yasuhiro Yokoyama, Gifu (JP); Hiroyuki Oyama, Kakamigahara (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

(21) Appl. No.: 11/352,151

(22) Filed: Feb. 10, 2006

(65) Prior Publication Data

US 2006/0126016 A1  Jun. 15, 2006

Related U.S. Application Data

(63) Continuation of application No. PCT/JP03/010466, filed on Aug. 19, 2003.

(51) Int. Cl.
  *G02C 7/02* (2006.01)
(52) U.S. Cl. .................. 351/177; 351/160 R; 351/178
(58) Field of Classification Search ................. 351/177
   See application file for complete search history.

(56) References Cited

U.S. PATENT DOCUMENTS 4,873,029 A * 10/1989 Blum .......................... 264/1.32
5,034,166 A    7/1991 Rawlings et al. ............ 264/1.7
5,160,463 A   11/1992 Evans et al. .................. 264/1.7
5,580,498 A   12/1996 Sugiyama et al. ........... 264/1.7
6,149,842 A * 11/2000 Lally et al. .................. 264/1.36
2002/0167640 A1* 11/2002 Francis et al. ............... 351/162
2004/0246436 A1* 12/2004 Turek et al. ................. 351/162

FOREIGN PATENT DOCUMENTS

JP       02-134612 A1   5/1990
JP       04-265710 A1   9/1992
JP     2000-122004 A1   4/2000

* cited by examiner

*Primary Examiner*—Jordan Schwartz
*Assistant Examiner*—Jessica Stultz
(74) *Attorney, Agent, or Firm*—Burr & Brown

(57) ABSTRACT

A method of manufacturing a contact lens having a mark is provided, wherein the contact lens is provided with a mark at the same time as the polymerization of the contact lens in the mold. The coloring composition, for the mark includes a medium which includes at least one monomer component of the monomer mixture used to form the polymer of the contact lens; and a predetermined dyestuff. A concave molding surface is roughened by forming a multiplicity of minute recesses by sputtering to define a marker portion, and the coloring composition is attached to the roughened concave molding surface. The coloring composition is then prepolymerized in the marker position before the monomer mixture of the contact lens material is introduced into and polymerized in the mold.

10 Claims, 8 Drawing Sheets

PROCESS FOR PRODUCING CONTACT LENS HAVING A MARK AND CONTACT LENS HAVING A MARK OBTAINED THEREBY

This application is a continuation of the International Application No. PCT/JP2003/010466, filed Aug. 19, 2003, the entirety of which is incorporated herein by reference.

TECHNICAL FIELD

The present invention relates in general to a method of manufacturing a contact lens with a mark and a contact lens with the mark obtained thereby. More particularly, the present invention relates to a method of advantageously manufacturing the contact lens, which has a colored mark of letters, figures, symbols, etc., which mark is formed by using a dyestuff such as a dye or a colorant, and the present invention relates to the contact lens with the mark obtained thereby.

BACKGROUND OF THE INVENTION

Conventionally, a contact lens is provided with an identifying mark in the form of letters and figures, symbols, patterns, etc., principally for easy distinction, at a time of wearing, between the front and back surfaces of the lens or between lenses for the left and right eyes, and/or indicating the specifications and/or maker of the lens, for instance.

Various methods have been adopted for marking the ophthalmic lens with the above-mentioned letters, figures, symbols, and patterns. For example, there are known printing methods, in which marks are transferred on the lens surfaces, i.e., on the back surface (base curved surface) and/or the front surface (front curved surface), by using an ink, which is obtained by dissolving or dispersing a dyestuff such as a dye or a colorant in an organic medium. There are also known laser radiation marking methods, in which desired marks are printed or engraved by using a laser.

However, with regard to the mark formed by the former printing method, there are anxieties that the dyestuffs of the mark may be flowed off, discolored, or peeled off due to various treatments repeatedly conducted on the lens, such as cleaning of the lens by rubbing and repetitive disinfection. Moreover, there is a problem that the printing of the mark, after the contact lens has been manufactured, requires many process steps, whereby the marking method is troublesome.

Meanwhile, the mark formed by the latter laser marking method is not easily readable. In addition, as the mark is made by forming grooves or recesses on the lens surface by the laser radiation, the thickness of the portions of the lens, which portions are subjected to the laser radiation, is inevitably reduced, or the lens material is denatured by the laser radiation. In either case, the mechanical strength of the ophthalmic lens is reduced. Further, deposits are likely to accumulate in the grooves or recesses made by the laser radiation, which may cause a trouble such as making a hotbed for breeding bacteria.

JP-A-2-134612 discloses a method of manufacturing a molded color contact lens, wherein the contact lens has a transparent central optical portion and a colored iris portion, which surrounds the central optical portion. In JP-A-2-134612, a predetermined portion of a molding surface of a mold is covered with a colored substance in the liquid state, so as to form a colored film. Subsequently, a liquid for forming a lens is introduced to the mold, and the liquid is polymerized, while the colored film is held to the mold. In this way, there is manufactured a contact lens, wherein the colored film and the lens body is integrated with each other, so that the surface of the colored film forms a part of the outer surface of the lens. Besides, in JP-A-4-265710, there is disclosed a method of manufacturing a contact lens with an iris pattern, wherein at least two different designs are provided on the surface of a mold for an mold assembly for polymerization, and these designs are transferred to the surface of the contact lens, by contacting with the surface of the mold, while the contact lens is molded and cured. In addition, in JP-2000-122004, there is proposed a method of manufacturing a colored contact lens with a colorful appearance, wherein after a dye composition is printed on a concave portion of a mold, a lens material is dropped on the mold, and the mold is subjected for spinning, whereby a semi-spherical surface (convex surface) is formed. In addition, particles of the colorant are dispersed in the lens material, owing to the centrifugal force, whereby the contact lens with the colorful appearance is manufactured.

However, with regard to the methods disclosed in the above-mentioned publications, there are anxieties that: a coloring composition (ink) may be repelled on the mold, when the coloring composition or the ink, which includes the dye or colorant, is printed on the surface of the mold; the dyestuff in the coloring composition may be exuded to the monomer mixture, when the coloring composition printed on the surface of the mold is caused to contact the monomer mixture to provide the polymer to form the contact lens, whereby the color of the coloring composition may be blurred and the mark formed on the contact lens may be unclear; the marker portion and the lens body cannot be sufficiently integrated to each other, whereby the marker portion remains on the mold; or an insufficient transfer of the marker portion, wherein the marker portion is easily removed from the contact lens, even if the marker portion is transferred. These problems cause to lower a yield of the product, and therefore, there are still needed further improvements.

DETAILED DESCRIPTION OF THE INVENTION

The present invention was developed in the light of the background art situations described above. It is therefore an object of the present invention to provide a coloration, which does not damage a contact lens and which is not discolored, and to provide an improved technique of manufacturing a contact lens, wherein the contact lens can be marked at the same time as the molding of the contact lens, without executing troublesome processes. In particular, the present invention provides a method of manufacturing the contact lens with the mark, which excels in adhesive strength of the coloring composition to the mold and, transferability of the marker portion to the contact lens, and clearness of the mark.

In the present invention, in order to solve problems as described above, there is provided (A) a method of manufacturing a contact lens with a mark, by using a mold assembly for polymerization comprising a male mold and a female mold which cooperate with each other to define therebetween a mold cavity having a configuration to provide a contact lens, the contact lens is formed by polymerizing a predetermined monomer mixture in the mold assembly, characterized by comprising the steps of: (B) roughening at least a position for a formation of a marker portion on a molding surface of at least one of the male and female molds by forming a multiplicity of minute recesses by sputtering, wherein the at least one of the male and female molds is made of a resin material; (C) attaching a coloring composition, which is obtained by dissolving or dispersing a predetermined dyestuff in a medium composed of at least one of monomer components of the monomer mixture, to the position of the molding surface which has been roughened by forming the multiplicity of minute recesses by sputtering, in a way that the coloring composition forms a shape of a predetermined mark; (D) prepolymerizing the marker portion consisting of the coloring composition attached to the molding surface; and (E) producing an intended contact lens of a polymer obtained by filling the monomer mixture in the mold cavity, to which the prepolymerized marker portion is attached, and polymerizing the monomer mixuture, while the polymerization of the coloring composition which comprises the marker portion is completed, so as to integrate the polymer to form the contact lens with the polymer to form the marker portion.

In the method of manufacturing the contact lens with the mark according to the present invention, the coloring composition, which includes the dyestuff, is attached to the molding surface, in a way that the coloring composition has the shape of the predetermined mark, and the monomer mixture to provide the polymer to form the contact lens is filled and polymerized in the molding surface of the mold assembly for polymerization. Accordingly, the marking of the contact lens is executed, at the same time as the molding of the contact lens, whereby the contact lens can be easily provided with the mark without requiring troublesome manufacturing processes. In addition, there is no difference in the level of the surface of thus obtained contact lens with the mark, which surface corresponds to the surface of the molding surface of the mold, i.e., no recess is made on the lens surface by the marking, so that no damage, e.g., deterioration of the strength, is given to the contact lens.

Besides, in the present invention, at least a part of, or entirety of, the molding surface of at least one of the male and female molds, which is made of the resin material, is roughened by forming the multiplicity of minute recesses by sputtering, and the coloring composition is given to the roughened portion with the minute recesses. Owing to this, the coloring composition is advantageously attached to the molding surface, without being repelled on the molding surface. In other words, at least the position for the formation of the marker portion of the molding surface is sputtered, so that the surface of the resin is physically roughened by forming the multiplicity of very minute recesses in the order of a size of a molecule or an atom. Accordingly, the adhesive strength of the coloring composition, which is in the liquid state, is improved, and the coloring composition can be advantageously attached to the molding surface, in the shape of the predetermined mark.

Moreover, in the present invention, there is adopted the coloring composition, which comprises the particular monomer compositions as the medium. More concretely, there is adopted the coloring composition, which comprises, as the medium, at least one of the monomer components of the monomer mixture, which provides the polymer to form the contact lens (the polymer, which forms the contact lens body). In addition, the coloring composition is prepolymerized before the introduction of the monomer mixture to the molding surface. Owing to the above, even if the monomer mixture is filled in the mold cavity, there is effectively prevented an occurrence of blur of the color, so that the contact lens is provided with a clear mark. Moreover, the dyestuff included in the coloring composition is taken in the polymer, so that the color of the mark is not faded out, even if thus obtained contact lens with the mark is immerged in an aqueous medium such as water.

In addition, the same monomer component is provided in both the coloring composition and the monomer mixture, so that the integration of the polymer to form the marker portion with the polymer to form the contact lens is highly advantageously realized. In other words, the polymer to form the marker portion and the polymer to form the contact lens are chemically strongly bonded to each other, by the polymerization between the monomer components, which provides each of the polymers. Owing to this, there are effectively prevented the problems that: the marker portion is not transferred to the contact lens and left on the molding surface, when the contact lens is removed from the mold; or the marker portion is easily removed from the contact lens, even if the marker portion is transferred to the contact lens.

In one preferred form of the method of manufacturing a contact lens with the mark according to the present invention, there can be used, as the dyestuff included in the above-mentioned coloring composition, a copper phthalocyanine derivative represented by the following formula (I);

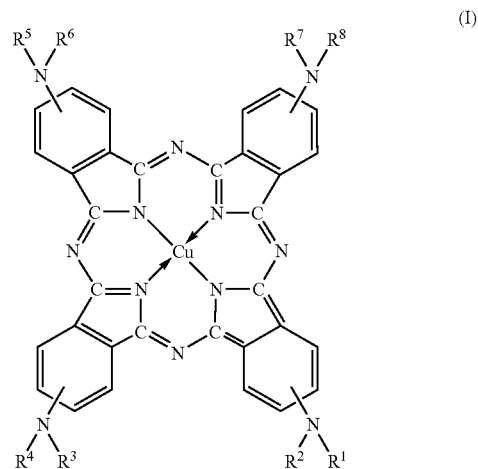

(I)

wherein each of $R^1$~$R^8$ is independently selected from the group consisting of hydrogen atom and a —CO-A group, in which the A of the —CO-A group represents alkyl group having a carbon number of 1~17, vinyl group, or 1-methyl vinyl group; and at least one of the $R^1$~$R^8$ is a methacryloyl group or an acryloyl group. The biological safety of the copper phthalocyanine derivative is assured, and the copper phthalocyanine derivative has at least one polymerizable functional group, i.e., at least one of a methacryloyl-modified amino group and an acryloyl-modified amino group. For this reason, the dyestuff itself is copolymerized with the monomer component which provides the polymer to form the contact lens or the polymer to form the marker portion, and is existed in the state of chemically bonded to the monomer component. Owing to this, discoloration of the mark is highly advantageously prevented, whereby the clearness of the mark is maintained for a long period of time. Moreover, the contact lens with the mark according to the present invention is characterized in that even if the contact lens is immersed in an organic solvent, the color of the contact lens is not extracted into the organic solvent.

In another preferred form of the method of manufacturing the contact lens with the mark according to the present invention, among the above-mentioned copper phthalocyanine derivatives, a compound (methacryloyl-modified tetramino copper phthalocyanine) represented by the following formula (II) can be especially preferably employed, because this compound has an excellent solubility to the monomer component, i.e., the coloring composition;

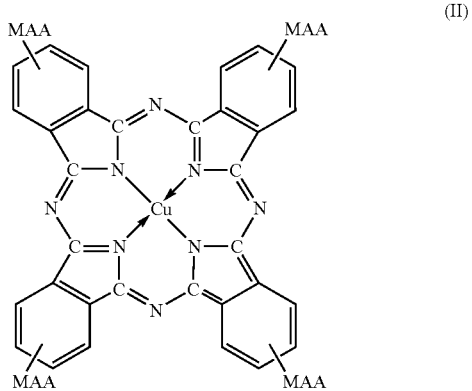

(II)

wherein MAA in the above formula (II) represents

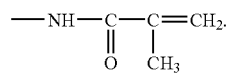

In another preferred form of the method of manufacturing the contact lens with the mark according to the present invention, Blue No. 204 (3,3'-dichlorindanthrene) or Blue No. 404 (phthalocyanine copper salt) is preferably employed as the dyestuff included in the above-mentioned coloring composition, because biological safety of these dyestuffs is guaranteed.

Moreover, in another preferred form of the present invention, it is desirable that the medium, which is one of components of the above-mentioned coloring composition, is the monomer mixture to provide the polymer to form the contact lens. If the medium, which is one of the components of the coloring composition, has the same monomer composition as that of the monomer mixture, the above-mentioned integration of the polymer to form the contact lens with the polymer to form the marker portion is further advantageously realized.

In addition, in another preferred form of the present invention, the dyestuff included in the coloring composition is dissolved or dispersed in the medium by an irradiation of an ultrasonic wave.

In another preferred form of the present invention, the dyestuff included in the coloring composition is dissolved or dispersed in the medium by a surfactant.

In another preferred form of the method of manufacturing the contact lens with the mark according to the present invention, it is desirable that a viscosity of the coloring composition after the prepolymerization is 100–27000 mPa·s at 25° C. Owing to this, even a small mark can be highly clearly formed.

In another preferred form of the method of manufacturing the contact lens with the mark according to the present invention, it is desirable that a specific gravity of the coloring composition after the prepolymerization is 0.90–2.00. Owing to this, even a small mark can be highly clearly formed.

In another preferred form of the present invention, the attaching of the coloring composition to the molding surface is executed by using a contact technique or a non-contact technique.

It is also a principle of the present invention to provide the above-mentioned contact lens with the mark produced in accordance with the present invention. On the thus obtained contact lens, there is formed the clear mark without the blur, as described above. The mark is firmly attached to the contact lens body, and the mark is extremely difficult to be removed. Moreover, the color of the mark is not faded, even if the contact lens is immersed in an aqueous medium, such as water.

DETAILED DESCRIPTION OF THE INVENTION

The above and other objects, features, advantages and technical and industrial significance of the present invention will be better understood by reading the following detailed description of presently preferred embodiment of the method of manufacturing the contact lens with the mark according to the present invention, when considered in connection with the accompanying drawings.

Figure 1:
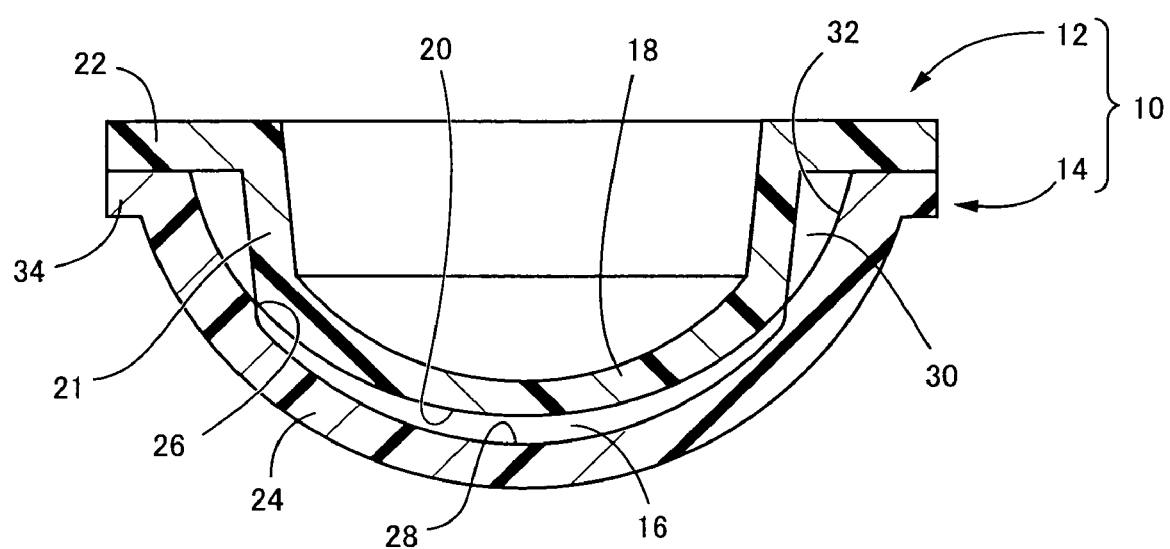
FIG. 1 is an elevational view in cross section showing a mold assembly for polymerization used for manufacturing a contact lens with a mark in accordance with the present invention.

Referring first to FIG. 1, there is shown one embodiment of the mold assembly for polymerization. The mold assembly for polymerization 10 of this embodiment is shown as a cross-sectional view, and consists of a male mold (upper mold) 12 and a female mold (lower mold) 14. When the male mold 12 and the female mold 14 are assembled together, there are formed a mold cavity 16 which has a configuration following that of the intended contact lens.

Figure 2:
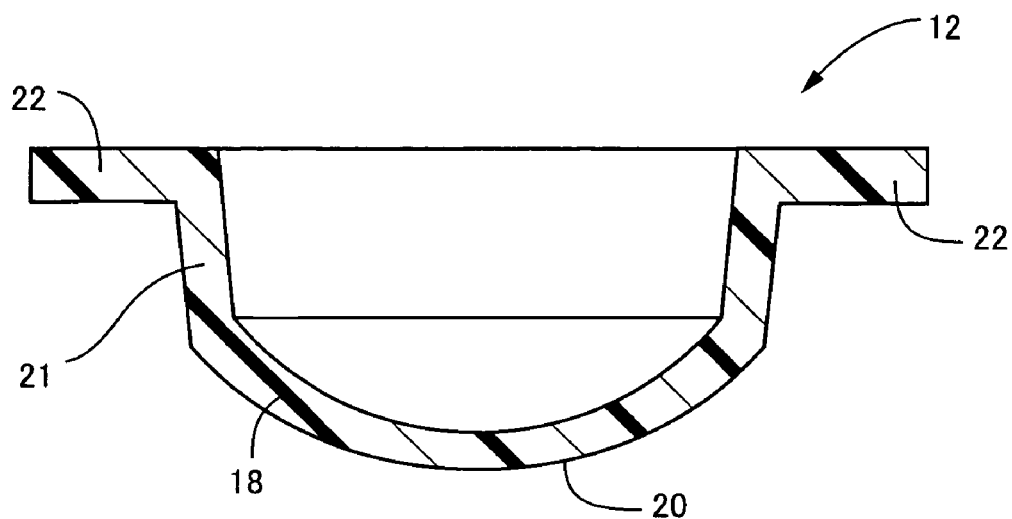
FIG. 2 is an elevational view in cross section showing a male mold, which is one of components of the mold assembly of FIG. 1.

In detail, the male mold 12, which is one of components of the mold assembly for polymerization 10 is a generally cup-like member, which is open at its upper end, as shown in FIG. 2. The male mold also has a bottom portion 18, which is located below the upper end, and which protrudes downwardly from the bottom end of the cylindrical portion. The outer surface (convex surface) of the convex bottom portion 18 of the male mold 10 functions as a convex molding surface 20 which has a profile accurately following that of a back surface (base curved surface) of an intended contact lens. An outward flange 22 is integrally formed with the male mold 12, at the outer circumferential surface of the upper end of the cylindrical portion, so as to extend radially outwardly therefrom.

Figure 3:
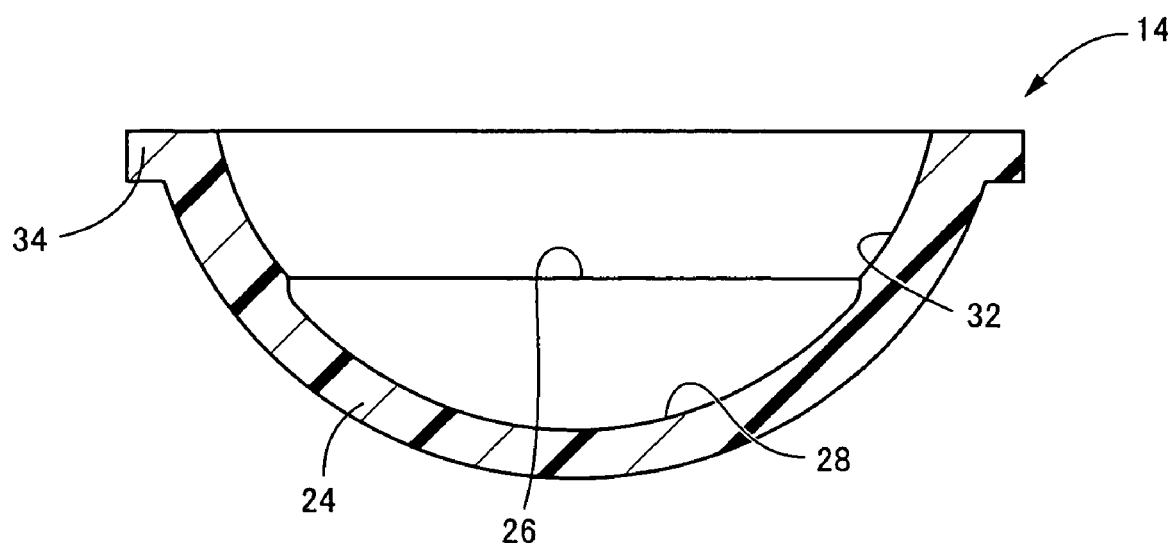
FIG. 3 is an elevational view in cross section showing a female mold, which is one of the components of the mold assembly of FIG. 1.

Meanwhile, the female mold 14, which is one of the components of the mold assembly for polymerization 10 has a generally bowl-like shape, in other words, the female mold 14 has a generally semi-spherical concave shape, as shown in FIG. 3. On the inner surface of the concave portion 24 of the female mold 14, a shoulder 26 is formed at an intermediate portion of the inner surface as seen in a direction of the depth of the concave portion 24, so that the inner surface is divided into two sections, i.e., a lower section and an upper section. The inner surface (concave surface) of the lower section, which is located lower than the shoulder 26, functions as a concave molding surface 28 which has a profile accurately following that of a front surface (front curved surface) of an intended contact lens. The inner surface of the upper section, which is located at a position higher than the shoulder 26, functions as a reservoir-defining surface 32, which partially defines a reservoir 30 to be explained below. An outward flange 34 is integrally formed with the female mold 14, at the outer circumferential surface of the upper end of the cavity portion 24, so as to extend radially outwardly therefrom.

As shown in FIG. 1, the male and female molds 12, 14 are closed or assembled together such that a lower end of the cylindrical portion 21 of the male mold 12 is held in abutting contact with an end of the shoulder 26 of the female mold 14, while the lower surface of the outward flange 22 of the male mold 12 is held in abutting contact with the upper surface of the outward flange 34. Owing to this configuration, the convex molding surface 20 of the male mold 12 and the concave molding surface 28 of the female mold 14 cooperate with each other to define, by means of the space provided in between these surfaces, a mold cavity 16 which has a configuration following that of the intended contact lens. The male mold 12 and the reservoir-defining surface 32 of the female mold 14 cooperate with each other to define, on the upper side of the abutting portion of the lower end of the cylindrical portion 21 of the male mold 12 and the shoulder 26, by means of the space provided in between the surfaces of these portions, the reservoir 30 for storing an excess polymeric material which overflows the concave portion 24.

Each of the male and female molds 12, 14 in the present embodiment is a resin mold formed of a predetermined resin material. The resin material to form the resin mold is suitably selected from known resin materials, taking the followings into consideration: affinity with the polymer and the monomer mixture to be polymerized into the polymer to provide the contact lens; cost; and formability. If the monomer mixture to be polymerized into the polymer, which forms the contact lens, is photopolymerized, optical permeability of the resin is also taken into consideration. Examples of the resin material include: polyolefin such as polyethylene, polypropylene, polymethylpentene, etc.; polyamide such as nylon 6, nylon 66, nylon 610, nylon 612, nylon 11, nylon 12, etc.; polystyrene; polycarbonate; polymethyl methacrylate; copolymer of ethylene and vinyl alcohol; polyacetal; polyimide; polyester; and polysulfone. Among them, if there are taking the economy and the formability into consideration, there are desirably used polyorefin such as polyethylene, polypropylene, polymethylpentene, etc.; and polyamide such as nylon 6, nylon 66, nylon 610, nylon 612, nylon 11, nylon 12, etc. The above-mentioned male mold 12 and female mold 14 may be formed of the same resin material, or may be formed of respective different resin materials. Each of the male mold 12 and the female mold 14 can be formed, by using a conventionally known method of forming molds. For example, these molds can be easily obtained by an injection molding of the above-mentioned resin material to dies, which have mold cavities having a configuration following that of the intended contact lens.

Figure 4:
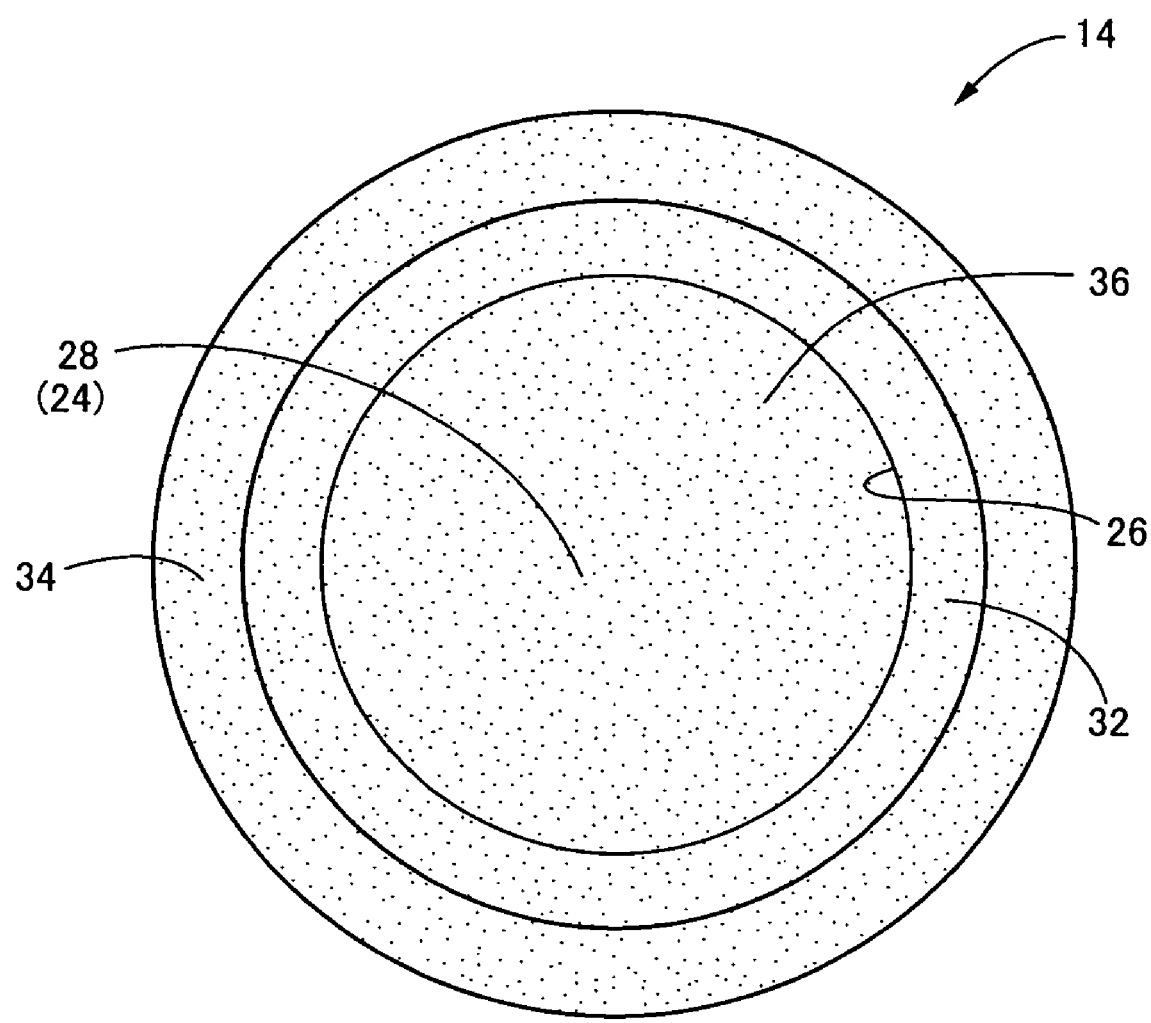
FIG. 4 is a plan view of the female mold of the mold assembly of FIG. 3.

In the present embodiment, as it is shown in FIG. 4, overall the upper surface of the female mold 14 of the resin-made male and female molds 12, 14, i.e., the upper surfaces of the concave molding surface 28, the reservoir-defining surface 32, and the outward flange 34 are roughened by forming the multiplicity of minute recesses by sputtering, and made into sputtered portion 36, of which attaching and adhesive strength of a coloring composition, which will be described later, is effectively improved. In FIG. 4, though the portion, which is roughened by forming the multiplicity of minute recesses (sputtered portion 36), is dotted for easier understanding, it is noted that, if it is visually observed, the appearance of the sputtered portion 36 does not differ from that of the portions of the surfaces, which are not roughened by forming the multiplicity of minute recesses. This is because the sputtered portion 36 is physically roughened by forming the multiplicity of very minute recesses in the order of a size of a molecule or an atom, and if it is visually observed, there is no difference in between the external appearances of the sputtered portion and that of the portions, which are not subjected to the sputtering.

As concrete methods for roughening the surface by forming the multiplicity of minute recesses by sputtering, there can be used, for instance, low-pressure plasma irradiation, atmospheric-pressure plasma irradiation, excimer UV-light irradiation, and corona-discharge. Among them, there can be especially preferably adopted the atmospheric-pressure plasma irradiation, the excimer UV-light irradiation, and the corona-discharge, because these methods can be implemented under an atmospheric-pressure, and enable further uniformed treatments.

In detail, the low-pressure plasma irradiation can be implemented, for instance, by irradiating plasma for 5 to 300 seconds to the resin mold (the female mold 14 for this embodiment) by using a plasma-discharge devise; under an inert-gas atmosphere such as oxygen or helium; under a reduced pressure of 0.1~2.0 Torr (13.3~267 Pa); and at an output of 10~100 W. As the plasma-discharge devise, there can be suitably adopted a commercially available device, e.g., MODEL PA-102AT available from KYOTO DENSHI KEISOKU KABUSHIKIGAISHA.

The plasma discharge is effectively executed, for instance, by using a plasma discharge device, and placing the resin mold (the female mold 14 in this embodiment) under the electrode and irradiating the mold with the plasma discharge, under conditions that: the output is 10 to 100 W; distance between the electrode and the sample is 1 to 20 mm; and the duration is 1 to 180 seconds. As the atmospheric-pressure plasma irradiation unit, there can be suitably adopted a commercially available device, such as an atmospheric-pressure plasma irradiation unit available from OKAYA SEIRITSU ENGINEERING CO., LTD.

Further, the irradiation of the excimer UV-light can be realized, for instance, by using an excimer laser device, and placing the resin mold (the female mold 14 in this embodiment) under the light source, and irradiating the mold with the excimer UV-light for 1 to 180 seconds, under conditions that: the out put is 10 to 100 W; and the distance between the light source and the female mold is 1 to 20 mm, for instance. The irradiation of the excimer UV-light can be advantageously realized by using a commercially available device, such as an excimer laser irradiation unit available from Quarksystems Co., Ltd.

The corona-discharge can be executed, for instance, by using a corona-discharge device, under conditions that: the output is 10 to 1000 W; the length of the electrode is 100 to 500 mm; the span is 1 to 20 mm; the processing speed is 0.1 to 10 m/min.; and the resin mold (the female mold 14 in this embodiment) is passed under the wire electrode for 1 to 10 times, by shifting the mold. The corona-discharge can be advantageously realized by using a commercially available device such as a corona-discharge device for surface treatment, e.g., (high-frequency power source CT series: CT-0212 available from KASUGA DENKI INC.).

Figure 11:
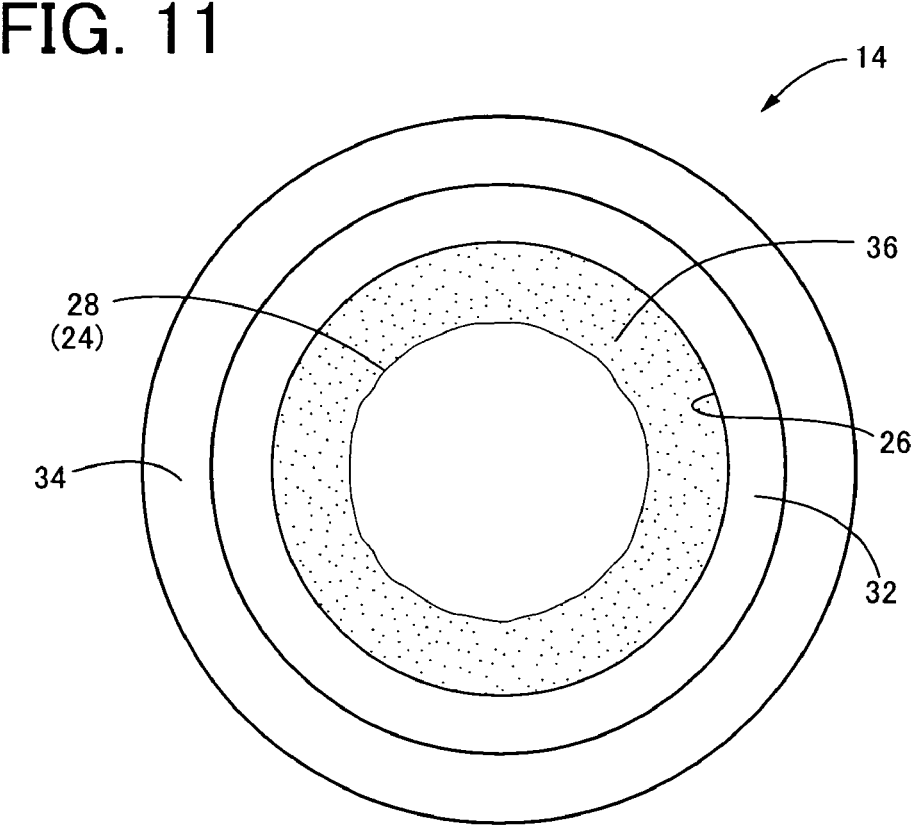
FIG. 11 is a plan view of a female mold of a mold assembly for polymerization, wherein an annular region of the surface of the mold is roughened by forming the multiplicity of minute recesses.

The surface roughening by forming the multiplicity of minute recesses by the above-mentioned sputtering does not necessarily need to be executed all over the upper surface of the female mold 14 (upper surfaces of the concave molding surface 28, the reservoir-defining surface 32, and the outward flange 34). The sputtering may be executed only to the concave molding surface 28 or to a part of the concave molding surface 28 (see FIG. 11), according to the above-described method. It is also possible to treat a part of, or entirety of, at least the convex molding surface 20 of the male mold 12, without treating the female mold 14. In other words, only portions of the male and female molds 12, 14, to which portions the coloring composition, which will be described later, is desired to be attached (the positions for the formation of the marker portions), need to be roughened by forming the multiplicity of minute recesses by sputtering. In the present embodiment, the entire upper surface of the female mold 14 is roughened by forming the multiplicity of minute recesses. In FIG. 11, there is shown an examples in which only the peripheral portion of the concave molding surface 28 of the female mold 14, i.e., only the position to provide the peripheral portion, except for the position to provide the optical portion on the front curve surface of the intended contact lens, on the concave molding surface 28, is roughened by forming the multiplicity of minute recesses by sputtering. This can be advantageously realized by sputtering the female mold 14, while the entirety of the position on the concave molding surface 28, except for the peripheral portion thereof, is covered or sheltered.

In the mold assembly for polymerization 10 of the present embodiment, the concave molding surface 28 of the female mold 14 is treated, by sputtering, into the sputtered portion 36, of which the adhesive strength of the coloring composition is effectively enhanced. Owing to this, the coloring composition is not repelled on the concave molding surface 28, so that the coloring composition is advantageously attached or printed to form the configuration of the intended mark (see FIG. 6).

The method comprising the processes to be explained below, for instance, is adopted to produce the intended contact lens with the mark, by using the mold assembly for polymerization 10 as described above.

Figure 5:
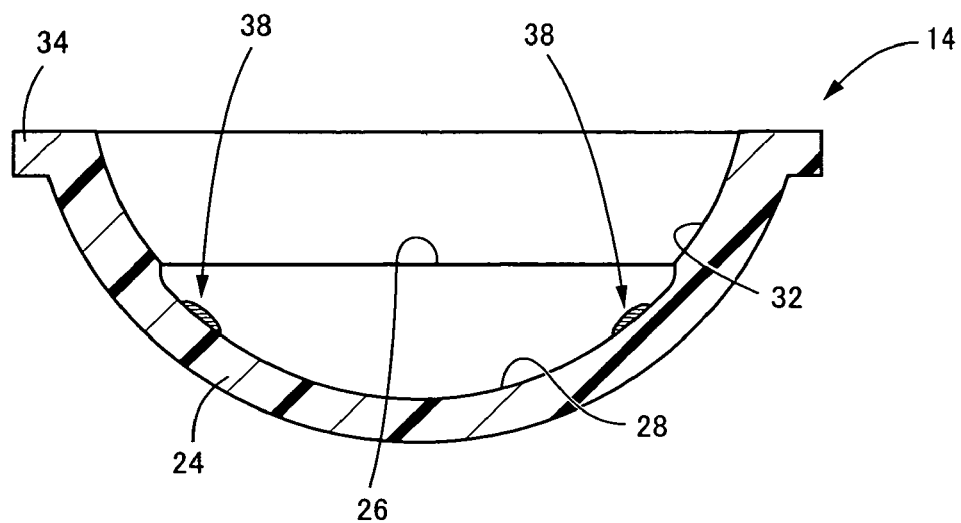
FIG. 5 is a view showing one process step of forming the contact lens with the mark using the mold assembly for polymerization, wherein a coloring composition is printed on the concave portion of the female mold shown in FIG. 3.
Figure 6:
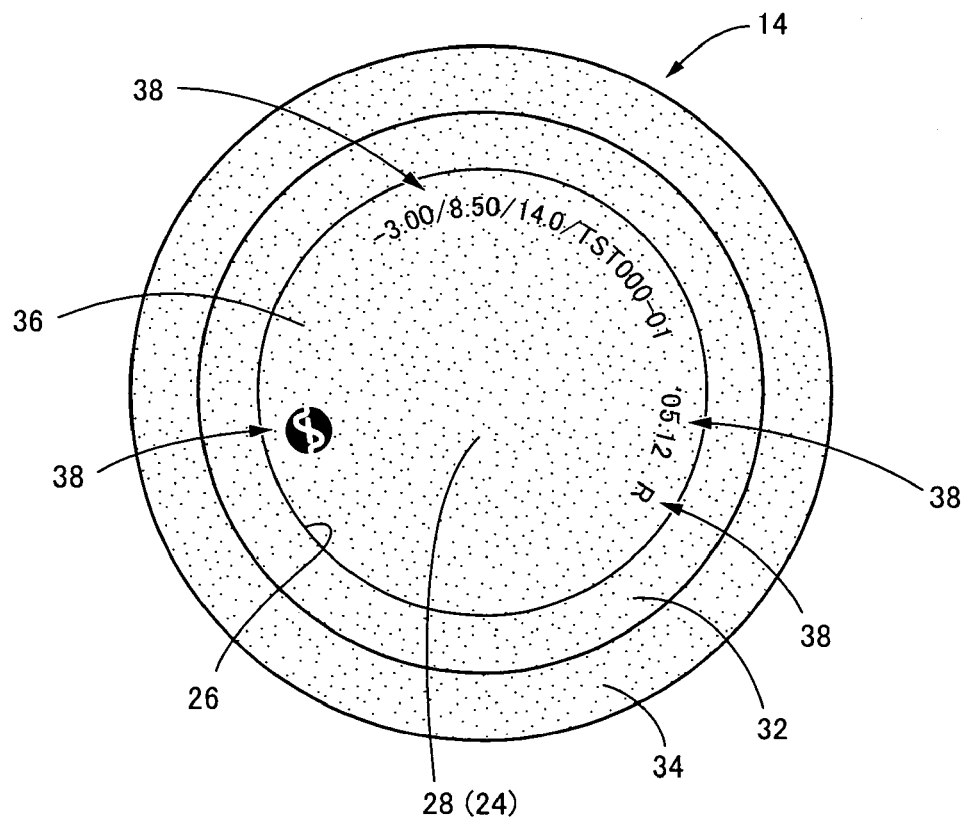
FIG. 6 is a plan view of the female mold of the mold assembly of FIG. 5.

That is, in this embodiment, firstly the marker portion 38 is formed, by attaching or printing the coloring composition in the liquid state, on the sputtered portion 36 of the concave molding surface 28, which is roughened by forming the multiplicity of minute recesses, so as to finally provide a specification of the lens, a lot number, an expiration date, symbols for distinction between lenses for the left and right eyes, for instance, to the contact lens, as shown in FIGS. 5 and 6. The method of attaching or printing the coloring composition to the sputtered portion 36 is not particularly limited. There can be advantageously adopted any conventionally used marking methods, such as a method utilizing a contact technique whose typical example is a pad printing, and a method utilizing a non-contact technique, in which an ink-jet type marking device is used.

As the coloring composition, there is adopted a medium, comprising at least one monomer component, which is one of components of the monomer mixture to provide the polymer to form the contact lens, wherein the predetermined dyestuff is dissolved or dispersed in the medium.

For this reason, the medium as the main component of the coloring composition is suitably selected according to the kind of monomer mixture to be used. Any one of, or any combination of monomer components included in the monomer mixture to be used, is/are used as the medium. If there are common monomer components existed in both the coloring composition and the monomer mixture, the marker portion is strongly bonded to the lens, as it will be described below, so that an excellent transferability is advantageously realized. As the medium, there are especially preferably adopted ones, which have the same monomer composition as the monomer mixture. In other words, it is especially desirable to use the monomer mixture as the medium of the coloring composition. Owing to this, the marker portion is further strongly bonded to the lens body (polymer to form the contact lens), so that the excellent transferability is further advantageously realized.

As the monomer mixture, which provides the polymer to form the contact lens, there can be used a mixture obtained by mixing at least two kinds of suitably selected conventionally known monomer components, depending on the kind of intended contact lens, e.g., hard or soft contact lens and/or non-water containing or water containing contact lens, and characteristics, which are regarded as necessary for the contact lens, e.g., oxygen permeability. The monomer components, which compose the monomer mixture, are not particularly limited, and there can be used various conventionally known monomer components, which include: silicon-containing monomer such as silicon-containing (meth) acrylate, a derivative of a silicon-containing styrene, silicon-containing macromonomer, etc.; fluorine-containing monomer such as a derivative of a fluorine-containing styrene, fluorine-containing alkyl (meth)acrylate, etc.; esters of (meth) acrylic acid; (math)acrylate; and cross-linkable monomers. The above-described term " . . . (meth)acrylate" is generic to the following two compounds: " . . . acrylate" and " . . . methacrylate". Likewise, terms for the derivatives of (meth)acrylate are generic to " . . . acrylate" and " . . . methacrylate".

Meanwhile, as the dyestuff to be included in the coloring composition, there can be used conventionally known dye or paint, whether the coloring composition is polymerizable or non-polymerizable.

In detail, examples of the polymeric colorant include: azo type polymerizable dyestuffs such as 1-phenylazo-4-(meth)acryloyloxynaphthalene, 1-phenylazo-2-hydroxy-3-(meth)acryloyloxynaphthalene, 1-naphthylazo-2-hydroxy-3-(meth)acryloyloxynaphthalene, 1-(α-anthrylazo-2-hydroxy-3-(meth)acryloyloxynaphthalene, 1-((4'-(phenylazo)-phenyl)azo)-2-hydroxy-3-(meth)acryloyloxynaphthalene, 1-(2',4'-xylylazo)-2-(meth)acryloyloxynaphthalene, 1-(o-tolylazo)-2-(meth)acryloyloxynaphthalene, 2-(m-(meth)acryloylamide-anilino-4,6-bis(1'-(o-tolylazo)-2'-naphthylamino)-1,3,5-triazine, 2-(m-vinylanilino)-4-(4'-nitrophenylazo)-anilino-6-chloro-1,3,5-triazine, 2-(1'(o-tolylazo)-2'-naphtyloxy)-4-(m-vinylanilino)-6-chloro-1,3,5-triazine, 2-(p-vinylanilino)-4-(1'-(o-tolylazo)-2'-naphthylamino)-6-chloro-1,3,5-triazine, N-(1'-(o-tolylazo)-2'-naphthyl)-3-vinylphthalic acid monoamide, N-(1'-(o-tolylazo)-2'-naphthyl)-6-vinylphthalic acid monoamide, 3-vinylphthalate-(4'-(p-sulfophenylazo)-1'-naphtyl)monoester, 6-vinylphthalate-(4'-p-sulfophenylazo)-1'-naphtyl) monoester, 3-(meth)acryloylamide-4-phenylazophenol, 3-(meth)acryloylamide-4-(8'-hydroxy-3',6'-disulfo-1'-naphthylazo)-phenol, 3-(meth)acryloylamide-4-(1'-phenylazo-2'-naphthylazo)-phenol, 3-(meth)acryloylamide-4-(p-tolylazo) phenol, 2-amino-4-(m-(2'-hydroxy-1'-naphthylazo)anilino)-6-isopropenyl-1,3,5-triazine, 2-amino-4-(N-methyl-p-(2'-hydroxy-1'-naphthylazo)anilino)-6-isopropenyl-1,3,5-triazine, 2-amino-4-(m-4'-hydroxy-1'-phenylazo)anilino)-6-isopropenyl-1,3,5-triazine, 2-amino-4-(N-methyl-p-(4'-hydroxyphenylazo)anilino-6-isopropenyl-1,3,5-triazine, 2-amino-4-(m-(3'-methyl-1'-phenyl-5'-hydroxy-4'-pyrazolylazo)anilino)-6-isopropenyl-1,3,5-triazine, 2-amino-4-(N-methyl-p-(3'-methyl-1'-phenyl-5'-hydroxy-4'-pyrazolylazo) anilino)-6-isopropenyl-1,3,5-triazine, 2-amino-4-(p-phenylazoanilino)-6-isopropenyl-1,3,5-triazine, 4-phenylazo-7-(meth)acryloylamide-1-naphthol; anthraquinone based polymeric colorant such as 1,5-bis ((meth)acryloylamino)-9,10-anthraquinone, 1-(4'-vinylbenzoylamide)-9,10-anthraquinone, 4-amino-1-(4'-vinylbenzoylamide)-9,10-anthraquinone, 5-amino-1-(4'-vinylbenzoylamide)-9,10-anthraquinone, 8-amino-1-(4'-vinylbenzoylamide)-9,10-anthraquinone, 4-nitro-1-(4'-vinylbenzoylamide)-9,10-anthraquinone, 4-hydroxy-1-(4'-vinylbenzoylamide)-9,10-anthraquinone, 1-(3'-vinylbenzoylamide)-9,10-anthraquinone, 1-(2'-vinylbenzoylamide)-9,10-anthraquinone, 1-(4'-isopropenylbenzoylamide)-9,10-anthraquinone, 1-(3'-isopropenylbenzoylamide)-9,10-anthraquinone, 1-(2'-isopropenylbenzoylamide)-9,10-anthraquinone, 1-4-bis(4'-vinylbenzoylamide)-9,10-anthraquinone, 1-4-bis-(4'-isopropenylbenzoylamide)-9,10-anthraquinone, 1-5'-bis-(4'-vinylbenzoylamide)-9,10-anthraquinone, 1-5-bis-(4'-isopropenylbenzoylamide)-9,10-anthraquinone, 1-methylamino-4-(3'-vinylbenzoylamide)-9,10-anthraquinone, 1-methylamino-4-(4'-vinylbenzoyloxyethylamino)-9,10-anthraquinone, 1-amino-4-(3'-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9,10-anthraquinone-2-sulfonic acid, 1-amino-4-(3'-(meth)acryloylaminophenylamino)-9,10-anthraquinone-2-sulfonic acid, 1-amino-4-(3'-(meth)acryloylaminobenzylamino)-9,10-anthraquinone-2-sulfonic acid, 1-(β-ethoxycarbonyl allylamino)-9,10-anthraquinone, 1-(β-carboxy allylamino)-9,10-anthraquinone, 1,5-di-(β-carboxy allylamino)-9,10-anthraquinone, 1-(β-isopropoxycarbonyl allylamino)-5-benzoylaminde-9, 10-anthraquinone, 2-(3'-(meth) acryloylamide-anilino)-4-(3'-(3''-sulfo-4''-aminoanthraquinone-1''-yl-amino)-anilino)-6-chloro-1,3,5-triazine, 2-(3'-(meth)acryloylamide-anilino)-4-(3'-(3''-sulfo-4''-aminoanthraquinone-1''-yl)-amino-anilino)-6-hydrazino-1,3,5-triazine, 2,4-bis-((4''-methoxyanthraquinone-1''-yl-amino)-6-(3'-vinylanilino)-1,3,5-triazine, 2-(2'-vinylphenoxy)-4-(4'-(3''-sulfo-4''-aminoanthraquinone-1''-yl)-amino-anilino)-6-chloro-1,3,5-triazine; nitro type polymerizable dyestuffs such as o-nitroanilinomethyl (meth)acrylate. In addition to them, there can also be used copper phthalocyanine derivatives represented by the above formula (I), in detail, phthalocyanice type polymerizable dyestuffs such as (meth)acryloyl-modified tetramino copper phthalocyanine and (meth)acryloyl-modified (dodecanoyl-modified tetramino copper phthalocyanine). As the non-polymeric coloring reagent, there can be used, for instance, legally allowed dyestuffs such as Blue No. 204 (3,3'-dichlorindanthrene) and Blue No. 404 (phthalocyanine copper salt). These dyestuffs may be used alone or in combination as a mixture of two or more of them.

In the present invention, among the above-mentioned dyestuffs, copper phthalocyanine derivative, which is represented by the above-described formula (I), Blue No. 204 and Blue No. 404 are preferably used.

This is because, the copper phthalocyanine derivative represented by the above formula (I) has a characteristic of being hard, compared with the other polymerizable dyestuffs, and also its biological safety is assured. In addition, the copper phthalocyanine derivative has at least one polymerizable functional group, so that the dyestuff itself is co-polymerized with the monomer component and is existed at a state of chemically bonded. For this reason, discoloration of the mark is especially advantageously prevented, whereby the clarity of the mark is maintained for a long period of time. Moreover, as it is existed at a state of chemically bonded, even if it is immersed in an organic solvent, the dyestuff is not eluted in the organic medium. Among the copper phthalocyanine derivatives represented by the above formula (I), the copper phthalocyanine derivative represented by the above formula (II), i.e., methacryloyl-modified tetramino copper phthalocyanine (hereinafter it is abbreviated as APMA), can be especially preferably adopted, because APMA has four polymerizable groups, whereby APMA has an excellent solubility to the monomer, i.e., an excellent solubility to the medium.

Meanwhile, Blue No. 204 and Blue No. 404 can also be advantageously used, because biological safety of these dyestuffs is also guaranteed.

The above-mentioned dyestuff is added to the above-mentioned medium, so that the dyestuff is included in the medium. In this way, the coloring composition is composed. In this case, the dyestuff is included in the coloring composition in a state of being dissolved or being dispersed. In preparing the coloring composition, if the dyestuff is not easily dissolved or dispersed, it is desirable to irradiate ultrasonic waves, add a known amphiphilic surfactant, or irradiate the ultrasonic waves and add the surfactant, for thereby uniformly dissolving or dispersing the dyestuff in the coloring composition.

The concentration of the dyestuff in the coloring composition is not particularly limited. However, if the concentration of the dyestuff is too low, the mark, which can be visually identified, is not formed. On the other hand, if the concentration of the dyestuff is too high, the specific gravity of the mark is too deep, so that there is an anxiety that the visual field of the contact lens wearer may be interrupted. Therefore, it is desirable that the concentration of the dyestuff is suitably selected, based on the kind of the dyestuff to be used, within a range of 0.01 to 50% by weight, preferably 0.10 to 40% by weight, and more preferably 0.20 to 30% by weight.

Moreover, in order to advantageously realize the polymerization caused by heat and/or light, conventionally known radical polymerization initiators, photopolymerization initiators, and/or photosensitizers are suitably selected and added within an ordinary concentration range.

The marker portion 38 is formed by attaching or printing the above-described coloring composition to the concave molding surface 28. Subsequently, there is started the prepolymerization of the marker portion 38, which consists of the coloring composition attached to the molding surface 28.

The prepolymerization is executed in accordance with an ordinaly method of thermal polymerization and/or a photopolymerization. If the prepolymerization of the marker portion 38 is executed by the thermal polymerization, the female mold 14, on which the marker portion 38 has been formed, may be prepolymerized by using a constant temperature dryer, for instance, under a normal temperature, or under a nitrogen atmosphere taking an inhibition in radical polymerization into consideration, the prepolymerization may be executed, for instance, at a temperature of 20~80° C., preferably at a temperature of 30~70° C., for 10~60 minutes, preferably 20~50 minutes, for the prepolymerization. If the prepolymerization of the marker portion 38 is executed by the photopolymerization, the photopolymerization may be executed, for instance, by irradiating a blacklight (wavelength of radiation=350~400 nm) or a high pressure mercury lamp (wavelength of radiation=350~450 nm) to the marker portion 38, under a normal temperature and pressure, for 5~300 seconds. If the resin mold is made by, e.g., the injection molding, and the resin mold is roughened by forming the multiplicity of minute recesses by sputtering, the coloring composition may be attached to thus formed sputtered portion 36 (formation of the marker portion 38), while the mold still has a molding heat, so that the prepolymerization can be advantageously implemented by utilizing the molding heat remaining on the resin mold (the female mold 14), without requiring additional heating or the irradiation of the light.

The process of the prepolymerization is ended before the polymerization of the coloring composition, which constitutes the marker portion 38, i.e., before the monomer components in the coloring composition is completely polymerized and solidified. More preferably, the prepolymerization is executed, until the coloring composition loses its flowability and hardened to be a jelly-like substance, which is in its gelated state or a semi-gelated state and having a little elasticity and hardness. In other words, the prepolymerization is executed until the coloring composition has a molecular weight, which is assumed to be within a range of that of an oligomer.

In particular, it is desirable that the prepolymerization is executed in a way that the viscosity of the coloring composition after the prepolymerization (viscosity of the marker portion 38) at 25° C. is 100 to 27000 mPa·s, preferably 500 to 20000 mPa·s, and more preferably 1000 to 10000 mPa·s. This is because, if the viscosity of the coloring composition after the prepolymerization is too low, the dyestuff in the coloring composition is exuded to the monomer mixture, at the time of filling the monomer mixture into the mold cavity 16. Due to this, the color is blurred, and the mark formed on the contact lens is unclear. On the other hand, if the viscosity of the coloring composition after the prepolymerization is more than 27000 mPa·s, the coloring composition is solidified. Due to this, there is an anxiety that the marker portion 38 may be projected out of the contact lens surface, so that there may be a difference in the level of the surface of the thus obtained contact lens (polymer) after the molding. For this reason, there is an anxiety that the wearing comfort may be deteriorated, because the contact lens wearer may feel as if there is a foreign substance on the lens.

The specific gravity of the coloring composition after the prepolymerization becomes higher, in proportion to the increase of the above-mentioned viscosity. If the specific gravity is too low, the color may be blurred, whereby a clear mark cannot be formed. On the other hand, if the specific gravity is too high, the marker portion 38 and the lens body cannot be advantageously integrated. For these reasons, it is desirable that the specific gravity of the coloring composition is 0.90 to 2.00, preferably 0.95 to 1.50, and more preferably 1.00 to 1.20.

Figure 7:
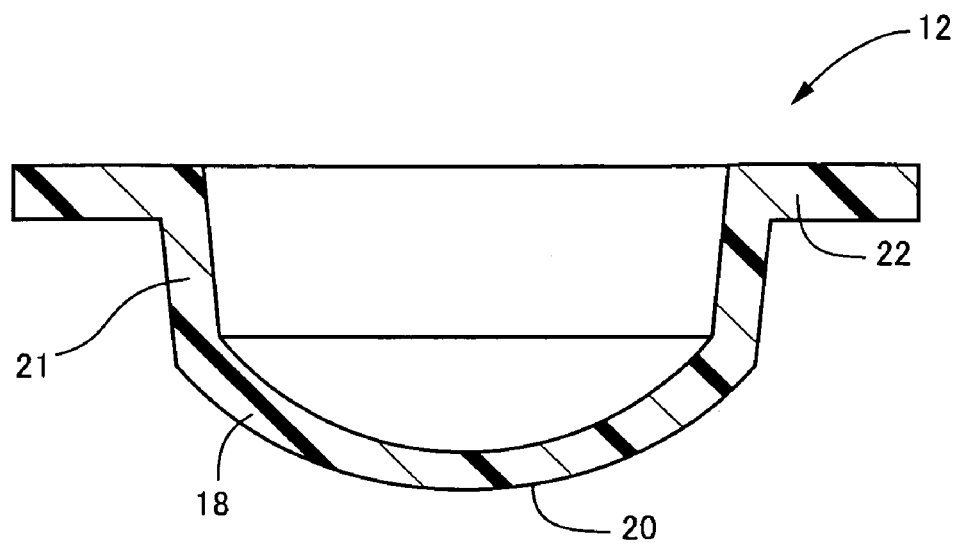
FIG. 7 is a view showing another process step of forming a contact lens using the mold assembly for polymerization, before the male mold is assembled with the semi-spherical concave portion of the female mold in which a polymeric material is accommodated.
Figure 7:
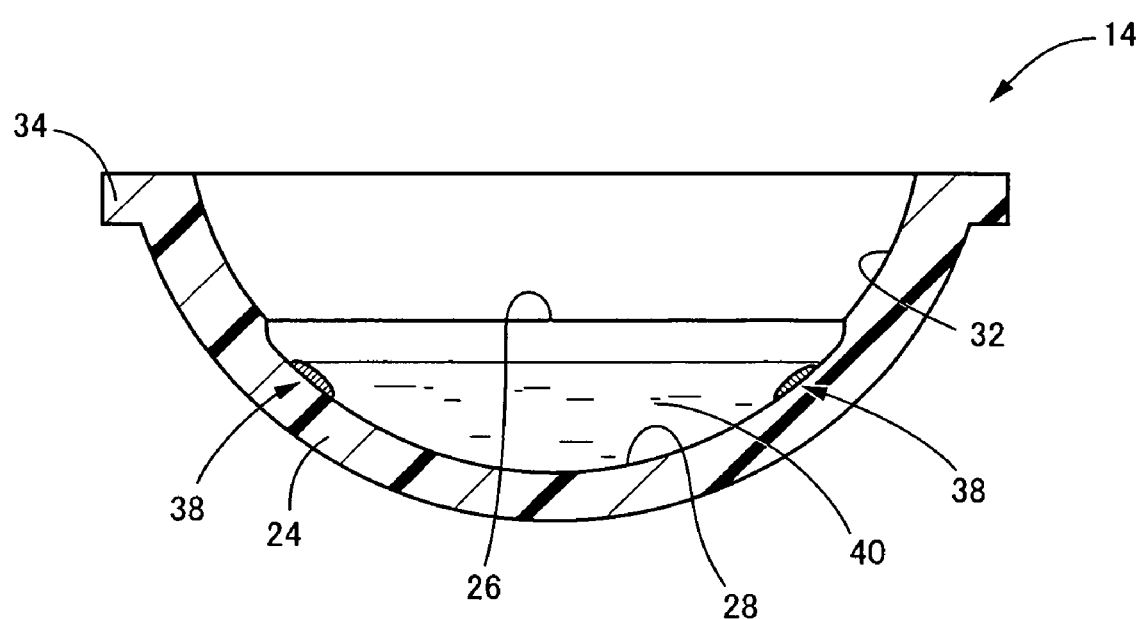

After the above-mentioned prepolymerization, a specified quantity of the monomer mixture 40 to form the intended contact lens is supplied from a feeding device, not shown, while the prepolymerized marker portion 38 is attached to the concave portion 24 of the female portion 14, as shown in FIG. 7.

In this case, the monomer mixture 40 includes at least one monomer, which is the same as the one included in the coloring composition, so that the monomer mixture 40 has an excellent affinity to the marker portion 38, which comprises the prepolymerized coloring composition. Therefore, the monomer mixture 40 is well adapted to the marker portion 38. Also, a portion of the monomer mixture 40 is impregnated to the marker portion 38.

Subsequently, the male and female molds 12, 14 are closed or assembled together such that a lower end of the exterior surface of the cylindrical portion 21 of the male mold 12 is held in abutting contact with an end of the shoulder 26 of the female mold 14, while the lower surface of the outward flange 22 of the male mold 12 is held in abutting contact with the upper surface of the outward flange 34. Owing to this configuration, a mold cavity 16 is formed between the male mold 12 and the female mold 14, and the monomer mixture is filled in this mold cavity 16 (see FIG. 8). The excess polymeric material flowing out of the mold cavity 16, because of the assembling, is stored in the reservoir 30, which is formed at an upper position of the mold cavity 16.

The monomer mixture 40 to be filled in the mold cavity 16 of the mold assembly for polymerization 10 is not particularly limited. Instead, there can be used various monomer mixtures, which are varied in their composition, obtained by combining conventionally known various monomer components, based on the kind of the intended contact lens, e.g., hard or soft contact lens; and/or non-water containing or water containing contact lens; and characteristics needed for the contact lens, e.g., oxygen permeability, as described above.

To the monomer mixture 40, there will be no problem to add suitable amount of conventionally used various general additives, such as a UV-absorbing agent, a dyestuff, etc., as needed. Moreover, a non-polymerizable medium may be used within an amount, which does not obstruct the polymerization of the monomers.

The monomer mixture 40 is, while it includes a known polymerization initiator, poured into the mold cavity 16 of the mold assembly for polymerization 10, and is polymerized according to an ordinary method of the polymerization.

As the method of the polymerization, there may be used, for example, a heat-polymerization, wherein the monomer mixture 40 is heated gradually or in steps from the room temperature to about 130° C., after the polymerization initiator is added to the monomer mixture. Alternatively, there may be used a photopolymerization, wherein the monomer mixture is polymerized by exposure to an electromagnetic radiation such as microwave, an ultraviolet radiation, a radiant ray (γ-ray), etc. The polymerization may be executed by methods of the polymerization such as a mass polymerization and a medium polymerization using a medium, etc., or by other suitable methods.

The above-mentioned polymerization initiator may be suitably selected, based on the method of polymerization to be employed. Generally, if the heat-polymerization is employed, a radical polymerization initiator is used, and if the polymerization is achieved by the exposure to the electromagnetic radiation, a photopolymerization initiator or a photosensitizer is used.

In detail, as the radical polymerization initiator, various kinds of conventionally known radical polymerization initiator can be suitably selected and employed. For example, azobisisobutyronitrile, azobisdimethylvaleronitrile, benzoyl peroxide, t-butyl hydroperoxide, cumene hydroperoxide, etc., may be used.

Meanwhile, as the photopolymerization initiator, various kinds of conventionally known photopolymerization initiator can be employed. For example, there may be used benzoin based photopolymerization initiator such as methyl orthobenzoylbenzoate, methylbenzoylformate, benzoinmethylether, benzoinethylether, benzoinisopropylether, benzoinisobutylether, benzoin-n-butylether, etc.; phenone photopolymerization initiator such as 2-hydroxy-2-methyl-1-phenylpropane-1-one, p-isopropyl-α-hydroxyisobutylphenone, p-t-butyltrichloroacetophenone, 2,2-dimethoxy-2-phenylacetophenone, α,α-dichloro-4-phenoxyacetophenone, N,N-tetraethyl-4,4-diaminobenzophenone, etc.; 1-hydroxycyclohexylphenylketone; 1-phenyl-1,2-propanedione-2-(o-ethoxycarbonyl)oxime; thioxanthone photopolymerization initiator such as 2-chlorothioxanthone, 2-methylthioxanthone etc.; dibenzosuberone; 2-ethylanthraquinone; benzophenoneacrylate; benzophenone; and benzyl, etc.

Any one of, or any combination of, above-mentioned polymerization initiators may be used. In either case, it is desirable that the total amount of the polymerization initiators is not less than 0.002 parts by weight, preferably not less than 0.01 parts by weight per 100 parts by weight of all the monomer components (total amount of the monomer components). For avoiding a problem, such as a generation of bubbles in the polymer to be obtained, the upper limit of the polymerization initiator is generally not more than 10 parts by weight, preferably not more than 1 part by weight, per 100 parts by weight of the total amount of the monomer components.

Figure 8:
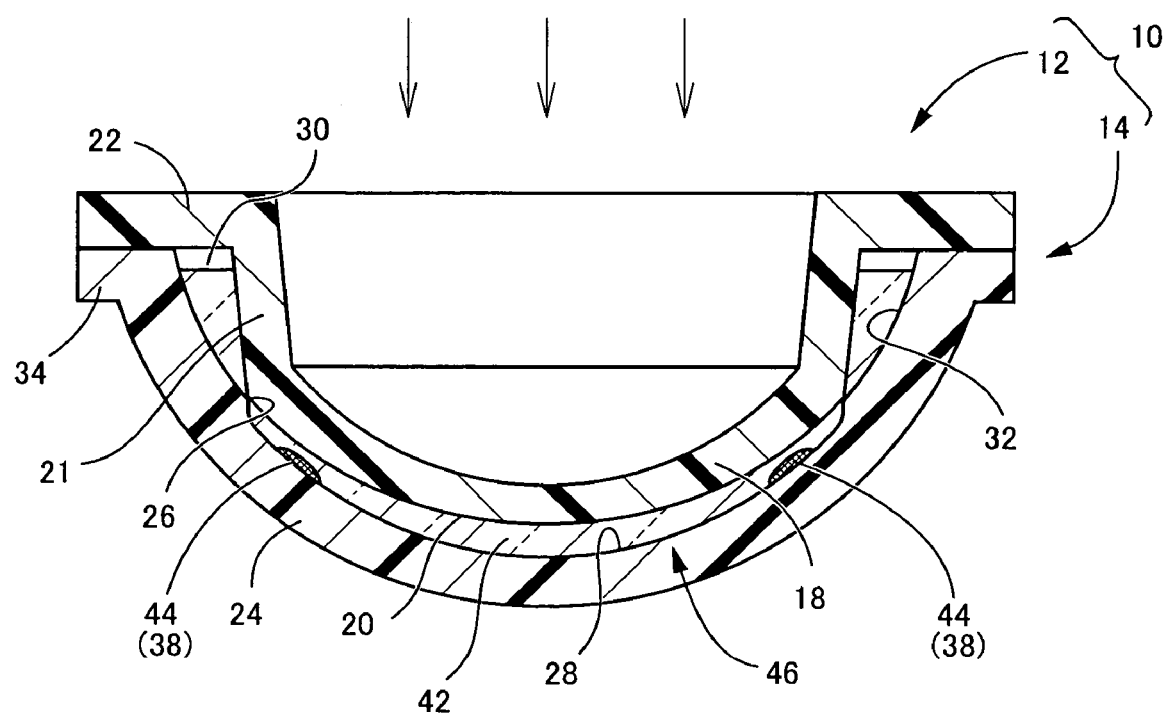
FIG. 8 is a view showing another process step of forming a contact lens with a mark using the mold assembly for polymerization, wherein a desired contact lens is formed in the mold cavity defined between the male and female molds.

The intended contact lens with the mark is formed in the mold assembly by the polymerization of the monomer mixture 40 as described above. In the present embodiment, the UV radiation is introduced into the mold cavity through the male mold 12, formed of the transparent material, which permits the transmission of UV radiation therethrough, as shown in FIG. 8.

Owing to the above, the monomer mixture 40 is photopolymerized, so that the intended contact lens body (the polymer to form the contact lens 42) is formed, while the polymerization of the coloring composition to form the marker portion 38, which has been prepolymerized, is completed, as described above. During this polymerization, the polymerizable group existed in the coloring composition, which constitutes the marker portion 38, is polymerized or copolymerized with the monomer components in the monomer mixture 40, so that they are chemically bonded to each other. Therefore, the polymer to form the contact lens 42 and the polymer to form the marker potion 44 are firmly integrated to each other.

In addition, the polymer, in which the polymer to form the contact lens 42 and the polymer to form the marker portion 44 are strongly integrated to each other, is provided with a base curved surface, which corresponds to the convex molding surface 20 of the male mold 12, and with a front curved surface, which corresponds to the concave molding surface 28 of the female mold 14.

Figure 9:
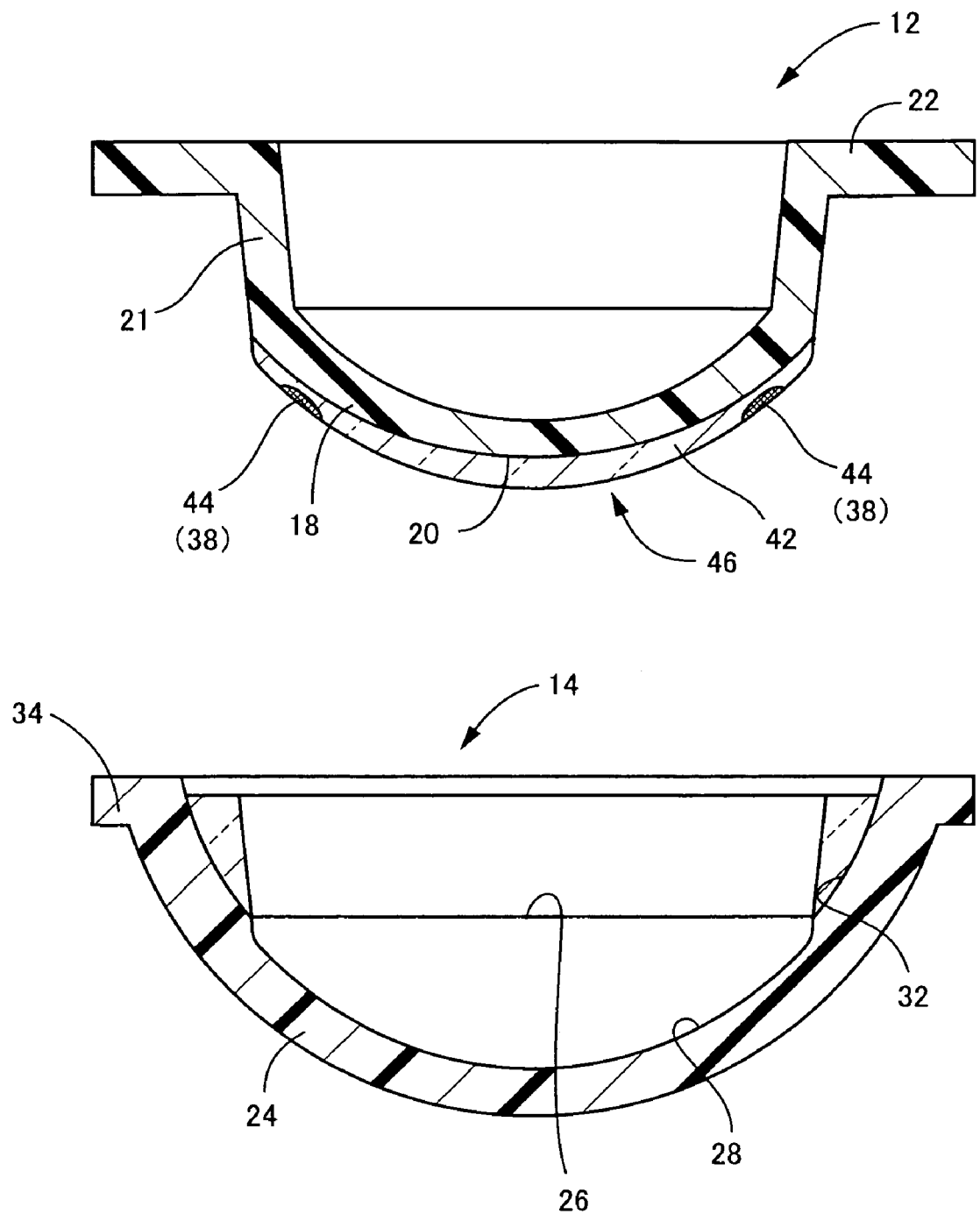
FIG. 9 is a view showing still another process step of forming a contact lens using the mold assembly of FIG. 1, wherein the male and female molds are separated away from each other.
Figure 10:
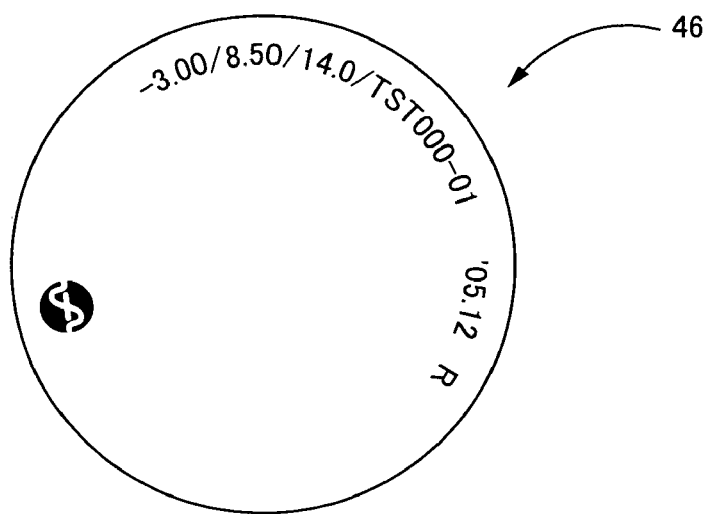
FIG. 10 is a plan view of a contact lens, manufactured according to one embodiment of the present invention, wherein the contact lens is seen from the back surface of the contact lens.

Thereafter, the male mold 12 is separated away from the female mold 14, as shown in FIG. 9. After the separation of the molds, the contact lens is removed from the mold by an ordinary removal method, whereby the marker portion 38 can be transferred to the contact lens body (42), as shown in FIG. 10, and the contact lens with the mark 46 can be obtained.

As described above, in the present embodiment, there is advantageously realized the strong integration of the polymer to form the contact lens 42 and the polymer to form the marker portion 44 (marker portion 38) at the time of the polymerization. Owing to this, there are effectively prevented the problems that: the marker portion 38 is not transferred to the contact lens and left on the molding surface, when the contact lens is removed from the mold; or the marker portion is easily removed from the contact lens, even if the marker portion is transferred to the contact lens.

Besides, there is not caused the blur in the color of the mark formed on the contact lens 46, on account of the above-mentioned prepolymerization of the coloring composition, whereby the mark is very clear and distinct. Moreover, since the position for forming the marker portion provided on the concave molding surface 28 of the mold assembly for polymerization 10 is roughened by forming the multiplicity of minute recesses by sputtering, the adhesive strength or the printability of the coloring composition to the concave molding surface 28 is effectively improved, whereby the desired mark is surely formed on the contact lens 46.

Moreover, the dyestuff included in the coloring composition is taken in the polymer, while the dyestuff is bound by polymerization, or while the dyestuff is at its non-bonding state, so that the color of the mark is not faded, even if thus obtained contact lens with the mark 46 is immerged in the aqueous medium such as water.

In addition, the base curbed surface and the front curved surface of the contact lens with the mark 46 respectively correspond to the convex molding surface 20 and the concave molding surface 28 of the mold assembly for polymerization, so that there is no difference in the level of the surface of thus obtained contact lens with the mark. Therefore, there are no anxiety of a deterioration of the mechanical strength and a reproduction of bacteria, which are caused by a conventional method of marking by forming recesses on the lens surface.

Moreover, if the contact lens is manufactured as described above, marking of the contact lens is executed at the same time as the molding of the contact lens. Owing to this, the marking process, which has been conventionally implemented after the formation of the contact lens, can be programmed with one continuous operation for manufacturing the contact lens, whereby the contact lens with the mark can be manufactured at a low cost.

While the presently preferred embodiments of this invention have been described in detail, the invention is not limited to the details of the foregoing description, but may be otherwise embodied.

In the above embodiment, both the male mold 12 and the female mold 14, which provide the mold assembly for polymerization 10, are made of the resin material. However, the present invention is not limited to this constitution. There can be enjoyed the above-mentioned effects owing to the present invention, as long as the mold to be roughened by forming the multiplicity of minute recesses by sputtering, i.e., the mold having the molding surface, to which the coloring composition is printed, is formed of the resin material. For instance, it is possible that one of the molds, on which the marker portion 38 is to be printed, is formed of the resin material, while the other mold is formed of another material, such as a glass, quartz, fused quartz, or a metal. The mold assembly can be obtained by a known method, such as injection molding, cutting work, etc.

In the above-described embodiment, the marker portion 38 was formed only at a peripheral zone except for an optical zone of the concave molding surface 28, so as to form the mark only at the peripheral zone of the contact lens. However, the marker portion 38 may be formed anywhere on the concave molding surface 28, as long as the marker portion 38 does not interrupt the visual field of the contact lens wearer.

In the above-mentioned embodiment, the coloring composition is attached to the concave molding surface 28 of the female mold 14. It is also possible to attach the coloring composition to the convex molding surface 20 of the male mold 12, or to both the molding surfaces 28, 20 of the female and male molds 14, 12. In this case, at least the position, to which the coloring composition is attached, i.e., the position for forming the marker portion, needs to be roughened by forming the multiplicity of minute recesses by sputtering, as referred to above.

Moreover, in the above Example, there are formed, as the mark, specification, lot number, quality preservation period of the lens, the distinctive marks to identify lenses for the left and right eyes, and the trade mark etc. of the lens. However, configuration of the marks to be formed in accordance with the present invention is not particularly limited. There may also be formed an iris pattern, in addition to the distinctive marks for the distinction between the front and back surfaces and/or between the lenses for the left and right eyes, and characters and symbols.

It is to be understood that the present invention may be embodied with various changes, modifications and improvements, which may occur to those skilled in the art, without departing from the spirit and scope of the invention defined in the attached claims.

EXAMPLES

To further clarify the concept of the present invention, some examples of the invention will be described. It is needless to mention that the invention is not limited to the details of the illustrated examples and the foregoing description.

Example 1

(1) There was obtained a coloring composition, in which the concentration of the dyestuff was 0.27% by weight, by dissolving the dyestuff (APMA) represented by the above formula (II) in a medium (CL composition) which had a composition as indicated in the following TABLE 1.

(2) There were obtained three pairs of mold assemblies for polymerization made of polyamide, and overall the concave portion of the female molds of the resin molds were roughened by forming the multiplicity of minute recesses. As the sputtering process, three respective processes (a) to (c), which will be described below, were implemented for the concave portion of the three female molds.

(a) Excimer UV Light Irradiation

The female mold was placed under a light source, and overall the concave surface of the female mold was irradiated with the excimer UV light, using an excimer laser irradiation unit available from Quarksystems Co., Ltd, wherein the output was 50 W, the distance between the light source and the female mold was 1.5 mm, and the duration was 30 seconds.

(b) Atmospheric-Pressure Plasma Irradiation

The female mold was placed under an electrode, and overall the concave surface of the female mold was irradiated with the atmospheric-pressure plasma, using an atmospheric-pressure plasma irradiation unit available from OKAYA SEIRITSU ENGINEERING CO., LTD, wherein the output was 50 W, the distance between the electrode and the female mold was 10 mm, and the duration was 20 seconds.

(c) Corona-Discharge

The female mold was placed under a wire electrode, and the corona-discharge was implemented for overall the concave surface of the female mold, by using a corona-discharge device (high-frequency power source CT series: CT-0212) available from KASUGA DENKI INC., wherein: the processing speed was 1 m/min.; the length of the electrode was 330 mm; the output was 480 W; the span (minimum distance between the wire electrode and the female mold) was 1 mm; and the female mold was passed under the wire electrode for eight times.

(3) The coloring composition was applied to the concave portion, which was roughened by forming the multiplicity of minute recesses by sputtering according to the above process (2), by using a stamp for printing the marker portion.

(4) The coloring composition was prepolymerized by leaving the female molds, to which the coloring composition was applied, in a constant temperature dryer at 50° C. for 30 minutes.

(5) After the monomer mixture as shown in TABLE 1 below had been filled in the female mold of the above step (4), the female mold was assembled together with the male mold. Subsequently, the mold assembly was placed in a constant temperature dyer for 30 minutes, whereby the monomer mixture was polymerized.

(6) After the polymerization had been completed, the contact lens was removed from the mold assembly for polymerization, and the contact lens was subjected to a process of elution, by using a purified water. 250 mL of the purified water was used per 1 g of polymer to form the contact lens. Subsequently, the contact lens was sterilized by a process of steaming under pressure, and the contact lens with the mark was obtained.

TABLE 1

|  |  | Medium (CL composition) | Monomer mixture |
|---|---|---|---|
| Polymerizable monomer | Dimethylacrylamide | 57 | 57 |
|  | N-vinyl pyrrolidone | 19 | 19 |
|  | Methyl methacrylate | 28 | 28 |
|  | Macromonomer*[1] | 24 | 24 |
|  | Ethylene glycol dimethacrylate | 0.3 | 0.3 |
| Dye (APMA) |  | — | 0.014 |
| Polymerization initiator (Azobisisobutyronitrile) |  | 0.07 | 0.07 |

Unit: parts by weight
*[1]The macromonomer comprises methyl methacrylate, 2-hydroxybutyl methacrylate, allyl methacrylate, and ethylene glycol dimethacrylate, which are constituted by the following four units (CAS Registry Number: 169873-86-3, Molecular weight: 1000~25000).

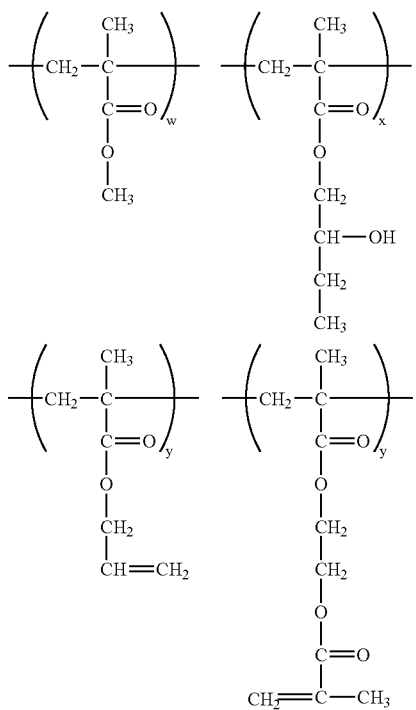

Examples 2 to 6

The contact lenses with marks were manufactured similarly to the above-mentioned Example 1, except that the dyestuffs and/or the concentration of the dyestuffs to obtain the coloring composition were as shown in TABLE 2.

Comparative Examples 1, 3, and 5

As it is shown in TABLE 3 below, the contact lenses with marks for the Comparative Examples 1, 3, and 5 were prepared similarly to the Examples 1, 2, and 3, respectively, except that the prepolymerization under the item (4) was not implemented.

Comparative Examples 2, 4, and 6 to 8

As it is shown in TABLE 3 or 4 below, the contact lenses for Comparative Examples 2, 4, 6, 7, and 8 were manufactured similarly to the above-mentioned Examples 1, 2, 3, 5, and 6, respectively, except that these contact lenses were not roughened by forming the multiplicity of minute recesses by sputtering.

Comparative Examples 9 to 12

As it is shown in TABLE 4 below, in the Comparative Examples 9 to 12, tetrahydrofuran (THF) was adopted as the medium for the coloring composition, so that it was impossible to implement the prepolymerization. With the exception of this, the contact lenses with the marks for the Comparative Examples 9 to 12 were manufactured similarly to the above Examples 1 to 4, respectively.

Subsequently, there were measured or evaluated viscosity of the coloring composition, specific gravity of the coloring composition, printability of the coloring compositions to the mold, and transferability of the marker portion to the contact lens and the clearness of the mark of the Examples 1 to 6 and Comparative Examples 1 to 12, as described below. In Examples 1 to 6 and Comparative Examples 1, 3, 5, 9 to 12, which were subjected to the sputtering process, the above-mentioned three kinds of sputtering processes (a) to (c) were separately executed. However, the TABLES 2 to 4 collectively show the results of these sputtering processes, because each kind of the sputtering processes exhibited similar results.

Measurement of Viscosity of the Coloring Composition

The viscosity of the coloring composition was measured by using an E-type viscometer called VISCONIC ED type (rotational viscometer) available from Tokyo Keiki Co., Ltd. The measurement was executed in accordance with "Accompanying book B (Regulations) conical-plate system" of JIS K7117-2 "Plastics—polymers/resins in the liquid state or as emulsions or dispersions—Determination of viscosity using a rotational viscometer with defined shear rate". The viscosities of the coloring compositions of the Examples 1 to 6 and Comparative Examples 2, 4, and 6 to 8 were measured at 25° C., after the coloring compositions were prepolymerized under a condition similar to that of the above-mentioned prepolymerization (at 50° C. for 30 minutes). This is because it is difficult to measure the viscosities of the prepolymerized coloring compositions, if they are attached to the female molds.

Measurement of Specific Gravity of the Coloring Composition

The specific gravity of the coloring composition was measured by using a Wardon type pyconometer. The specific gravities of the coloring compositions of the Examples 1 to 6 and Comparative Examples 2, 4, and 6 to 8 were measured at 25° C., after the coloring compositions were prepolymerized under a condition similar to that of the above-mentioned prepolymerization (at 50° C. for 30 minutes). This is because it is difficult to measure the specific gravities of the prepolymerized coloring compositions, if they are attached to the female molds.

Evaluation of Printability (Adhesive Strength) to the Mold-

The printability (adhesive strength) of the coloring compositions to the concave portions of the female molds was evaluated based on the following standards.

⊙=Excellent, ○=Good, Δ=Somewhat poor, and X=Poor

Evaluation of Transferability to the Contact Lens

The transferability of the marker portion to the contact lens body was evaluated based on the following standards.

⊙=Excellent, ○=Good, Δ=Somewhat poor, and X=Poor

Clarity of the Mark

The clarity of the mark formed on the surface of the contact lens was evaluated by visually inspecting the contact lens, which had been removed from the molds, based on the following standards.

⊙=Excellent, ○=Good, Δ=Somewhat poor, and X=Poor

TABLE 2

|  | Example | | | | | |
| --- | --- | --- | --- | --- | --- | --- |
|  | 1 | 2 | 3 | 4 | 5 | 6 |
| Dyestuff | APMA | APMA | Blue No. 204 | Blue No. 204 | Blue No. 404 | Blue No. 404 |
| Concentration of the dyestuff (%) | 0.27 | 0.50 | 0.27 | 0.50 | 0.27 | 0.50 |
| Medium | CL composition | CL composition | CL composition | CL composition | CL composition | CL composition |
| Prepolymerization | Yes | Yes | Yes | Yes | Yes | Yes |
| Sputtering | Yes | Yes | Yes | Yes | Yes | Yes |
| Viscosity of the coloring composition (mP·s) | 5000[*1] | 5000[*1] | 5000[*1] | 5000[*1] | 5000[*1] | 5000[*1] |
| Specific gravity of the coloring composition | 1.07[*1] | 1.07[*1] | 1.07[*1] | 1.07[*1] | 1.07[*1] | 1.07[*1] |
| Printability to the mold | ⊙ | ⊙ | ○ | ○ | ○ | ○ |
| Transferability to the CL | ⊙ | ⊙ | ○ | ○ | ○ | ○ |
| Clearness of the mark | ⊙ | ⊙ | ○ | ○ | ○ | ○ |

[*1] Viscosity or specific gravity after the prepolymerization

TABLE 3

|  | Comparative Example | | | | | |
| --- | --- | --- | --- | --- | --- | --- |
|  | 1 | 2 | 3 | 4 | 5 | 6 |
| Dyestuff | APMA | APMA | APMA | APMA | Blue No. 204 | Blue No. 204 |
| Concentration of the dyestuff (%) | 0.27 | 0.27 | 0.50 | 0.50 | 0.27 | 0.27 |
| Medium | CL composition | CL composition | CL composition | CL composition | CL composition | CL composition |
| Prepolymerization | No | Yes | No | Yes | No | Yes |
| Sputtering | Yes | No | Yes | No | Yes | No |
| Viscosity of the coloring composition (mP·s) | 33[*2] | 5000[*1] | 34[*2] | 5000[*1] | 33[*2] | 5000[*1] |
| Specific gravity of the coloring composition | 1.01[*2] | 1.07[*1] | 1.01[*2] | 1.07[*1] | 1.01[*2] | 1.07[*1] |
| Printability to the mold | Δ | Δ | Δ | Δ | Δ | Δ |
| Transferability to the CL | Δ | Δ | Δ | Δ | Δ | Δ |
| Clearness of the mark | Δ | Δ | Δ | Δ | Δ | Δ |

[*1] Viscosity or specific gravity after the prepolymerization
[*2] Viscosity or specific gravity before the application to the mold

TABLE 4

|  | Comparative Example | | | | | |
| --- | --- | --- | --- | --- | --- | --- |
|  | 7 | 8 | 9 | 10 | 11 | 12 |
| Dyestuff | Blue No. 404 | Blue No. 404 | APMA | APMA | Blue No. 204 | Blue No. 204 |
| Concentration of the dyestuff (%) | 0.27 | 0.50 | 0.27 | 0.50 | 0.27 | 0.50 |
| Medium | CL composition | CL composition | THF | THF | THF | THF |
| Prepolymerization | Yes | Yes | No | No | No | No |
| Sputtering | No | No | Yes | Yes | Yes | Yes |
| Viscosity of the coloring composition (mP·s) | 5000[*1] | 5000[*1] | 0.88[*2] | 0.88[*2] | 0.88[*2] | 0.88[*2] |
| Specific gravity of the coloring composition | 1.07[*1] | 1.07[*1] | 0.89[*2] | 0.89[*2] | 0.89[*2] | 0.89[*2] |
| Printability to the mold | Δ | Δ | X | X | X | X |
| Transferability to the CL | Δ | Δ | X | X | X | X |
| Clearness of the mark | Δ | Δ | X | X | X | X |

[*1] Viscosity or specific gravity after the prepolymerization
[*2] Viscosity or specific gravity before the application to the mold As it is apparent from the above TABLES 2 to 4, the Examples 1 to 6 were evaluated as ⊚ or ○, in terms of all the evaluation items, i.e., the printability of the coloring composition to the mold, the transferability of the marker portion to the contact lens, and the clarity of the mark, so that there is understood that these contact lenses with the marks are advantageously manufactured. Among the Examples, especially excellent results were obtained by the Examples 1 and 2, in which APMA was used as the dyestuff.

On the other hand, the Comparative Examples 1 to 8, in which there were not executed the prepolymerization on the sputtering, were evaluated as Δ, in terms of all the evaluation items, i.e., the printability of the coloring composition to the mold, the transferability of the marker portion to the contact lens, and the clarity of the mark. Therefore, it is recognized that, if there is not executed at least one of the prepolymerization and the sputtering, the contact lens with the mark cannot be advantageously manufactured. The Comparative Examples 9 to 12, in which THF was used as the medium, were evaluated as X, in terms of all the evaluation items, i.e., the printability of the coloring composition to the mold, the transferability of the marker portion to the contact lens, and the clarity of the mark, so that these are not suitable for a practical use.

INDUSTRIAL APPLICABILITY

As is apparent from the foregoing description, if the contact lens solution is manufactured in accordance with the present invention, the marking of the contact lens can be executed at the same time as the molding of the contact lens. Moreover, the present invention excels in the adhesiveness of the coloring composition to the mold, the transferability of the marker portion to the contact lens, and the clearness of the mark, so that the present invention can provide a great variety of designs to the contact lens.

What is claimed is:

1. A method of manufacturing a contact lens having a mark, said method comprising the steps of:
    providing a mold assembly for polymerization comprising a male mold and a female mold which cooperate with each other to define a mold cavity therebetween having a configuration sufficient to provide a contact lens at least one of said male and said female molds comprising a resin; and
    forming said contact lens by polymerizing a predetermined monomer mixture in said mold assembly, said contact lens forming step comprising the steps of
    roughening at least a portion of a molding surface of at least one of said male and female molds for a marker portion by sputtering to form a multiplicity of minute recesses,
    providing a coloring composition by dissolving or dispersing a predetermined dyestuff comprising a polymeric colorant having a polymerizable functional group in a medium composed of at least one monomer component of said monomer mixture of said contact lens,
    attaching said coloring composition to said portion of said molding surface that was roughened during said roughening step so that said coloring composition defines a predetermined shape of a mark in said marker portion,
    prepolymerizing said coloring composition in said marker portion after said coloring composition is attached to said molding surface in said marker portion,
    filling said monomer mixture of said contact lens into said mold cavity after said coloring composition is attached in said marker portion, and
    polymerizing said monomer mixture as said prepolymerization step is completed, so as to at least partially copolymerize said monomer mixture and said coloring composition in said marker portion to integrate a polymer formed from said monomer mixture of said contact lens with a polymer of said coloring composition in said marker portion.

2. The method of manufacturing a contact lens having a mark according to claim 1, wherein said dyestuff of said coloring composition is a copper phthalocyanine derivative represented by the following formula (I);

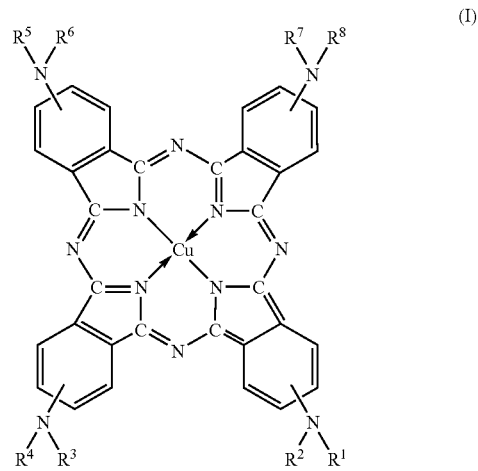

(I)

wherein each of $R^1 \sim R^8$ is independently selected from the group consisting of hydrogen atom and a —CO-A group, in which the A of the —CO-A group represents alkyl group having a carbon number of 1~17, vinyl group, or 1-methyl vinyl group; and at least one of the $R^1 \sim R^8$ is a methacryloyl group or an acryloyl group.

3. The method of manufacturing a contact lens having a mark according to claim 2, wherein said copper phthalocyanine derivative is a compound represented by the following formula (II);

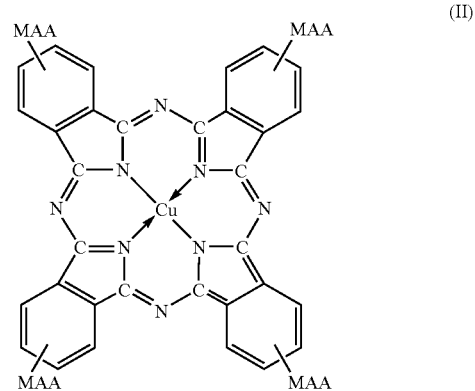

(II)

wherein MAA in the above formula (II) represents

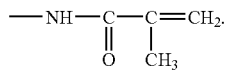

4. The method of manufacturing a contact lens having a mark according to claim 1, wherein said medium of said coloring composition is the monomer mixture of said contact lens.

5. The method of manufacturing a contact lens having a mark according to claim 1, wherein said dyestuff of said coloring composition is dissolved or dispersed in said medium by irradiation of an ultrasonic wave.

6. The method of manufacturing a contact lens having a mark according to claim 1, wherein said dyestuff of said coloring composition is dissolved or dispersed in said medium by a surfactant.

7. The method of manufacturing a contact lens having a mark according to claim 1, wherein a viscosity of said coloring composition after said prepolymerization step is 100–27000 mPa·s at 25° C.

8. The method of manufacturing a contact lens having a mark according to claim 1, wherein a specific gravity of said coloring composition after said prepolymerization step is 0.90–2.00.

9. The method of manufacturing a contact lens having a mark according to claim 1, wherein said step of attaching said coloring composition to said molding surface comprises one of a contact technique and a non-contact technique.

10. A contact lens having a mark provided by the method according to claim 1.

* * * * *